Patented Oct. 25, 1927.

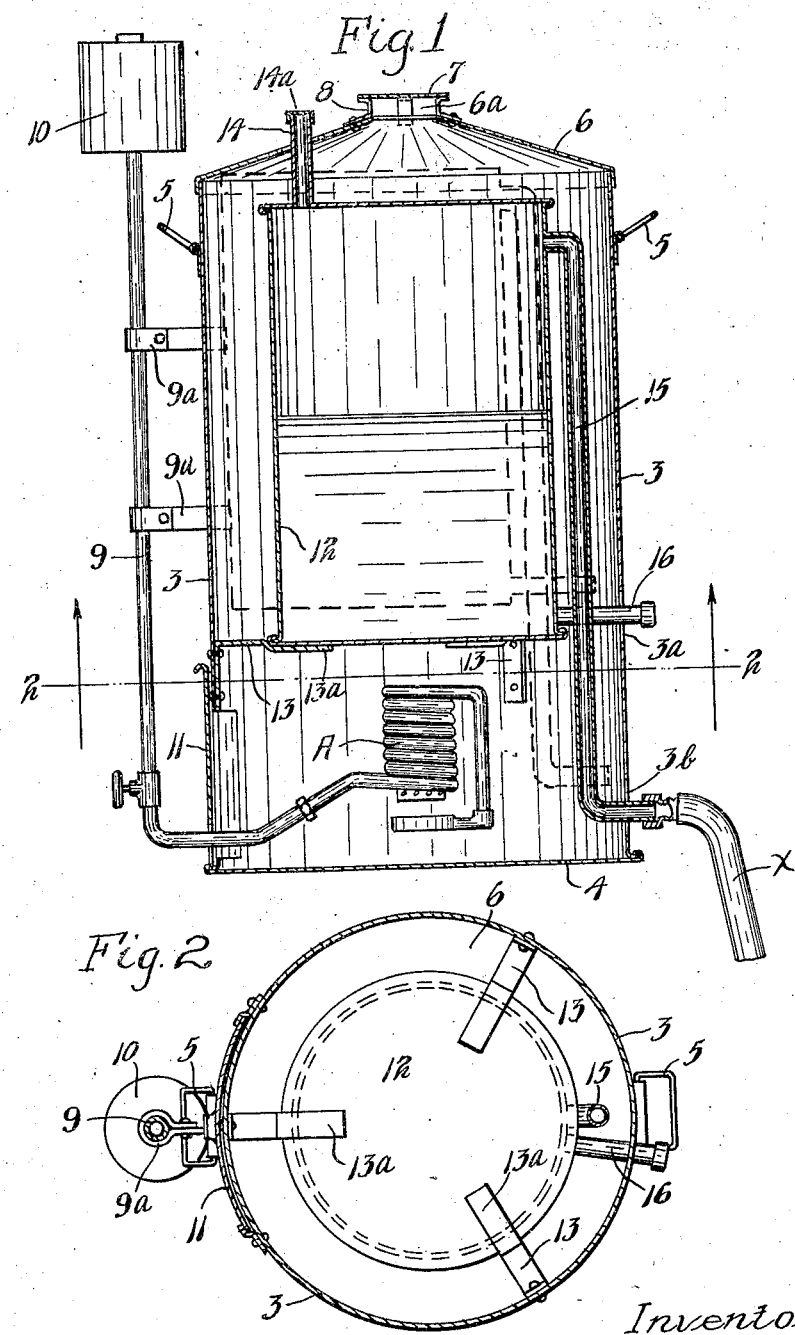

1,646,429

UNITED STATES PATENT OFFICE.

ERVIN E. SPLETTER, OF MONTEVIDEO, MINNESOTA.

WATER HEATER.

Application filed February 23, 1926. Serial No. 89,842.

This invention relates to water heaters or steam boilers capable of wide usage but especially adapted for agricultural purposes, such as devices for heating water and feed tanks for domestic animals.

It is an object of the invention to provide a simple but highly efficient water heater or boiler capable of being easily moved from place to place for use as desired and adapted to furnish steam or hot water with a high degree of efficiency.

It is a further object of the invention to provide such a device having an outer casing carrying the heating unit at the bottom thereof and equipped with a readily removable heater tank mounted therein in spaced relation to the walls thereof.

A more specific object of the invention is to provide in such a device an outer tank having a heating unit in the base thereof and an inner tank disposed above said heating unit within said outer casing having its delivery means communicating with the top portion thereof and extending downwardly in close relation to the heating unit whereby the steam or water will be taken from the top or hottest part of the tank and will be subjected to intense heat at the point where delivery is made.

These and other objects of the invention will be apparent from the following description made in connection with the accompanying drawings wherein like characters refer to similar parts throughout the several views, and in which Fig. 1 is a vertical section of a preferred form of the invention, and Fig. 2 is a cross section taken on the line 2—2 of Fig. 1.

In the drawings a relatively large preferably cylindrical sheet metal tank is indicated by the numeral 3 having a closed bottom or base 4 and provided at opposite sides adjacent the top thereof with the handles 5. A flanged cover 6 closely fits the top of tank 3 having the aperture 6ª in the top portion thereof partially closed by means of a ventilator 7, spaced thereabove and supported by means of small angle irons 8.

A heating unit of any desirable type, herein shown as being an oil burner, indicated by the letter A, is disposed in the base of casing 3, either resting on bottom 4 or supported from the sides thereof. Heating unit A is connected by means of conduit 9 to a tank or source of fuel supply 10 carried on the outer side of casing 3. As shown, the vertical portion of conduit 9 is secured to angle irons or clamps 9ª riveted to the side of casing 3. At the lower portion of one side of casing 3 a slidable door 11 is provided giving access to the heating unit and interior of casing 3. A closed cylindrical heating tank 12 of diameter considerably smaller than the diameter of casing 3, is supported within said casing by means of a plurality of substantially horizontally extending and circumferentially spaced brackets 13 riveted to the sides of said casing. Brackets 13 have depressed portions 13ª conforming to the shape of the base of tank 12 adapted to center said tank in spaced relation to the casing 3, leaving a substantial air space therebetween. Tank 12 is provided at its upper end at one side thereof with a vertical conduit 14 extending through an aperture in the top of cover 6 and normally closed with a cap 14ª. When delivery from tank 12 is otherwise shut off steam may be withdrawn from conduit 14 to be utilized for domestic purposes.

Tank 12 is also provided with an elongated vertically extending delivery conduit 15 disposed at the side thereof and communicating at its upper end with said tank adjacent the top or the hottest portion thereof. Conduit 15 extends in close relation to the sides of tank 12 and projects to a point adjacent the base 4 of casing 3, whereat it is bent at substantially right angles to pass through said casing, terminating therewithout. It will be noticed that conduit 15 is disposed in position to be strongly heated by heating unit A. A drain pipe 16 extends through casing 3 communicating with the bottom of tank 12, apertures 3ª and 3ᵇ being provided in casing 3 for the disposition of drain pipe 16 and conduit 15.

Operation.

The operation of the device is probably obvious from the foregoing description but may be briefly summarized as follows:

The supply of liquid to be heated is admitted through the conduit 14 at the top of the cover 6 whereupon the cap 14ª is replaced. When the heating unit is operated tank 12 will be thoroughly heated and the hot air will pass around the sides of said tank and out through the opening 6ª at the top of cover 6. The steam or hot water will be delivered from the top portion of the tank downwardly through conduit 15, which conduit is intensely heated by heating unit A and the hot air passing between the tank 12 and casing 3 so that heat will be applied to the delivered water or steam adjacent the very point of delivery. A hose X or other conduit may connect the extremity of conduit 15 to a trough, water tank or other device adapted to receive the heated fluid.

It will be apparent that if it is desirable to draw heated fluid from the top of the tank, for instance in heating water within a barrel or other object some distance above the ground, cap 14 may be secured to the delivery end of conduit 15 and the hose conduit X attached to conduit 14.

The heating unit A is rigidly secured in proper position to the outer tank and it will be obvious that the entire device may be carried from place to place very easily. All of the parts are light in weight and the entire device as commercially made should not exceed fifty pounds in weight.

While the device is especially adapted for agricultural use, it is capable of wide general usage and may be employed to furnish a supply of hot water for bathing or cooking purposes if so desired.

It will of course be understood that various changes may be made in the form, details and proportions without departing from the scope of the invention.

What is claimed is:

1. A water heater comprising a casing having a removable cover adapted to close the upper end thereof, inwardly extending supporting means secured to the inner periphery of said casing and spaced above the bottom thereof, a heating unit within said casing disposed below said supporting means, a tank of considerably smaller diameter than said casing adapted to be supported on said supporting means in spaced relation to said casing, a delivery conduit rigidly connected with said tank, the greater portion of said conduit being disposed between said tank and casing to receive heat from said heating unit, said conduit having a horizontal extremity passing through said casing and terminating slightly beyond the outer side of said casing to permit removal of said tank when the same is moved laterally from its support and lifted out of said casing.

2. A water heater comprising a cylindrical casing having a removable cover adapted to close the upper end thereof, a heating unit mounted within the lower portion of said casing, inwardly extending supporting means secured to the inner periphery of said casing above said heating unit, a tank of considerably smaller diameter than said casing mounted on said supporting means, said supporting means being provided with a concave seat to retain and center said tank in spaced relation to said casing, a pair of delivery conduits rigidly connected with said tank, the greater portions of said conduits being disposed between said tank and said casing, said conduits having straight horizontal extremities disposed in vertical alinement, said extremities passing through apertures in said tank and terminating slightly beyond the outer side of said tank whereby when said tank is disengaged from its supporting seat and moved laterally said tank and conduits may be lifted from the upper end of said casing.

In testimony whereof he does affix his signature.

ERVIN E. SPLETTER.